United States Patent Office 3,348,329
Patented Oct. 24, 1967

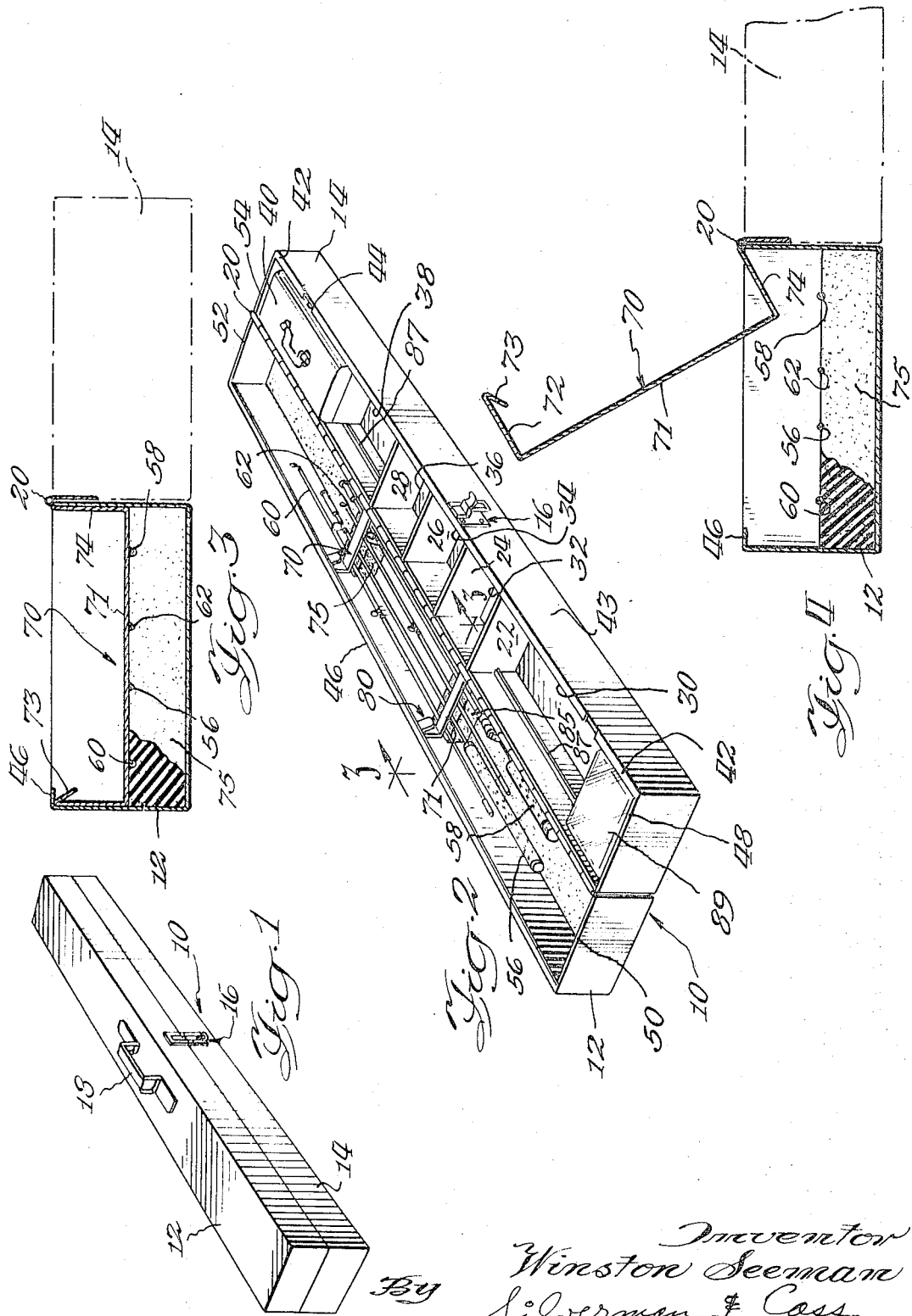

3,348,329
FISHING TACKLE BOX
Winston Seemann, Summit, Ill., assignor to Medallion Industries, Inc., Chicago, Ill., a corporation of Illinois
Filed Mar. 17, 1965, Ser. No. 440,375
1 Claim. (Cl. 43—26)

ABSTRACT OF THE DISCLOSURE

An elongate fishing tackle box having a lower tray section for accommodating tackle, bait, lures, etc. and a cover hingedly connected thereto and adapted to carry numerous fishing rod sections in immobile, damage-resistant fashion. Holding means for the rod sections provided in the cover which include a relatively U-shaped latch member, a transverse latch engaged lip, and resilient mounting pads positioned in aligned relationship with said latch and adapted to resiliently support the fishing rod sections. The U-shaped latch member being pivotally mounted to the hinged section of the box and having one leg portion thereof engaged under the lip with the base portion of the U-shaped latch cooperating with the resilient mounting block to clamp the fishing rod sections therebetween.

---

This invention relates generally to a fishing tackle box, and more particularly to a novel latching means for securing a fishing pole within the interior of the tackle box.

Previously a carrying case was provided for covering and carrying a fishing rod in disassembled condition, and a separate tackle box was provided for carrying the various reels, lures, bait, and other fishing paraphernalia.

Accordingly, it is a primary object of the instant invention to provide a novel fishing tackle box which can securely carry therein both fishing gear and disassembled fishing poles, the poles being positively retained immovable on the interior of the novel fishing tackle box during transport of the box.

Another object is to provide resilient means for protecting the fishing poles against damaging shocks while they are retained within the novel tackle box.

Additional objects are to provide a concealed, continuous piano hinge joining the two sections of the fishing tackle box which enables mounting of said latch advantageously; to provide a box that is compact in design, light in weight and readily portable and which is economical to manufacture and versatile in uses permitted therefor.

Additional objects will become apparent to the skilled artisan from the ensuing disclosure and the accompanying drawing in which a preferred embodiment is described and illustrated in detail.

In the drawing:

FIG. 1 is a perspective view of the novel fishing tackle box embodying the invention showing the box in closed position.

FIG. 2 is an enlarged perspective view of said tackle box, in opened position showing details of the interior construction of the box.

FIG. 3 is a sectional view taken through the fishing tackle box along the line 3—3 of FIG. 2 and in a direction indicated, showing the latching means in an engaged position.

FIG. 4 is a sectional view similar to FIG. 3, showing the latching means pivoted upwardly in a released position.

The invention is characterized by the provision of a novel tackle box having latching means in the cover section thereof for securing fishing poles on the interior of the cover section of the tackle box in the closed condition of the box. The box is formed of two sections hingedly joined together along adjacent lateral edges by a suitable hinge arrangement, such as the continuous piano hinge illustrated in the drawing. The box can be tightly sealed by conventional locking means on the front panels of the upper cover and lower tray sections of the box.

In FIG. 1, a fishing tackle box 10 is shown which has been constructed in accordance with the invention. Box 10 is comprised of two sections, an upper cover section 12 and a lower tray section 14 which are shown to be of substantially similar size and configuration. Locking means 16 keep the two sections in sealed contact along abutting edges and handle 18 attached on cover section 12 enables the fisherman to carry the box readily.

Box 10 is shown on a larger scale in FIG. 2 in order to emphasize the details of the novel cover section with its latching means. Sections 12 and 14 are joined along their adjacent edges by hinge 20, which has been illustrated as being of the familiar piano hinge type provided by regularly spaced inter-engaged circular hinge formations formed on the respective rear wall panels of sections 12 and 14 and held together by an elongate wire. It will be appreciated that some other form of hinge also will suffice.

Lower or tray section 14 is subdivided by a plurality of longitudinally spaced walls 22, 24, 26 and 28 into a series of rectangular compartments 30, 32, 34, 36 and 38. Compartments 30, 32, 34 and 36 may be utilized in a variety of ways to store bait, scaling knives, hooks, lures, and other fishing gear.

The largest compartment 38 is sufficient in size to accommodate a small tool box 40. The box is positioned against the outer wall panels of section 14 by providing a slot 44 in longitudinal lip or flange 42 which extends inwardly along the length of the front wall 43 of section 14. Slot 44 cooperates with the conventional locking means (not shown) on the front of the tool box 40 to permit clearance for said means while positioning said box 40 in compartment 38. Extending rearwardly from flange 42 are lateral lips or flanges 48 and 54.

Upper or cover section 12 has a longitudinal flange or lip 46 equal in length and width to lip 42 of bottom section 14, and lateral lips 50 and 52 in section 12 are identical in size to lips 48 and 54. When upper section 12 is pivoted about hinge 20 and into engagement with lower section 14, the lips rest upon one another and provide a substantially fluid-tight seal. This seal is effective as long as lock means 16 is retained in closed position.

Cover section 12 is of sufficient length to enable fishing poles to be secured therein and of sufficient depth so that the poles do not protrude into the bottom compartment 14 and interfere with the gear stored therein when the box 10 is closed. The pole handles are indicated by numerals 56 and 58, and the extending rod sections are indicated by numerals 60 and 62.

The novel latching means for retaining the disassembled fishing poles in position are shown generally in FIG. 2 and are identified by reference numerals 70 and 80. Latching means 70 and 80 are identical in construction and function so that reference is only made to the details of means 70 shown in FIGS. 3 and 4.

Latching means 70 is comprised of a U-shaped, integrally formed metallic member with a base or connecting web section 71 and upwardly extending arms 72 and 74. Arm 74 is mounted along piano hinge 20 and enables means 70 to pivot about the axis of the hinge. Arm 72 is formed with a flexible, return-bent ear 73 that extends at an angle toward web 71. Ear 73 resiliently engages the underside of flange or lip 46 to normally hold means 70 in closed position atop the fishing poles, as shown in FIG. 3 and substantially in contact with platform 75. When latching means 70 is depressed downwardly by exerting pressure on ear 73, the ear is disengaged from under lip 46 and enables latching means 70 to be released from engagement and pivoted about hinge 20.

Platforms 75 and 85 are provided upon which the pole handles and extension rods can rest without damage, even if the tackle box is subjected to sudden shocks and jolts. These platforms preferably are blocks of foam-like, resilient plastic. When latching means 70 and 80 are snapped under lip 46, the respective base members, such as 71, force the handles 56 and 58 and extension rods 60 and 62 downwardly into the upper surface of the foam-like blocks to substantially fully embed said handles and rods in the blocks, as shown in FIG. 3. When the latching means is released, the foam-like blocks return to their original shape and the handles and rods rest on the unstressed upper surface, as shown in FIG. 4. It will be appreciated that the cushioning blocks or platforms 75, 85 can be formed partially of a rigid material having a resilient pad attached to the end thereof on which the rods are supported.

It will be noted that tray part 14 has ledges such as 87 on which a container 89 can be supported above the floor of the tray part in a well known manner.

From the above description, it will be seen that the invention is capable of considerable variation, such as in the type and number of latching means and cushioning blocks used, without departing from the spirit or scope of the invention as defined in the appended claim.

What is desired to be secured by Letters Patent of the United States is:

An elongate fishing tackle box for storing both fishing rod sections and fishing gear in the interior thereof, said box comprising:

(a) two sections of substantially similar configurations,
(b) said sections being joined together along a common hinge for pivotal movement therebetween, thereby defining an upper cover section and a lower tray section,
(c) one of said sections being unbroken along its length, said length being of sufficient size to accommodate fishing rod sections,
(d) latching means associated with said rod accommodating section for securing fishing rod sections thereto,
(e) said latching means comprising:
　(1) a transversely extending lip formed on a side of the pole accommodating section opposite said hinge,
　(2) at least one U-shaped, integrally formed metallic latching member,
　(3) one arm of said U-shaped member being joined to said tackle box at said hinge to permit pivotal movement thereof,
　(4) the opposite arm of said U-shaped member being provided with a return bend flange on the end thereof, said end being adapted to be resiliently engaged under said lip to define a latching position for the base portion of the U-shaped latch member,
　(5) at least one resilient mounting and supporting block secured to the rod accommodating section of said tackle box in alignment with the U-shaped latching member to provide a resilient support for the fishing rod sections and to cooperate with said latching means to resiliently clamp said rod sections therebetween when the said opposite arm of said U-shaped member is engaged under said lip, wherein said base portion of the U-shaped latching member is a substantially planar section, corresponding to the width of said elongate rod accommodating section of said tackle box, the base portion contacting said block when the latching member is in latched position to substantially fully embed the fishing rod sections in said block.

References Cited

UNITED STATES PATENTS

| | | | |
|---|---|---|---|
| 1,669,928 | 5/1928 | Case | 43—57.5 |
| 1,748,841 | 2/1930 | Hermani | 206—4 X |
| 2,501,270 | 3/1950 | Fleming | 206—16 |
| 2,650,449 | 9/1953 | Suring | 43—26 |
| 2,685,363 | 8/1954 | Falk et al. | 206—16 |
| 2,816,390 | 12/1957 | Vaughn et al. | 43—26 |

SAMUEL KOREN, *Primary Examiner.*

D. J. LEACH, *Assistant Examiner.*